USO10182355B1

(12) United States Patent
Yan et al.

(10) Patent No.: US 10,182,355 B1
(45) Date of Patent: Jan. 15, 2019

(54) METHODS, SYSTEMS AND COMPUTER READABLE MEDIA FOR TESTING AN AIR INTERFACE DEVICE BY SIMULATING MULTI-USER EQUIPMENT (MULTI-UE) UPLINK VIRTUAL MULTIPLE INPUT MULTIPLE OUTPUT (MIMO)

(71) Applicant: Keysight Technologies, Inc., Minneapolis, MN (US)

(72) Inventors: Zhiyong Yan, Cary, NC (US); Roger Alan Slyk, Raleigh, NC (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 15/819,900

(22) Filed: Nov. 21, 2017

(51) Int. Cl.
*H04W 24/06* (2009.01)
*H04B 10/07* (2013.01)
(Continued)

(52) U.S. Cl.
CPC ............ *H04W 16/22* (2013.01); *H04B 17/29* (2015.01); *H04B 7/0413* (2013.01); *H04W 88/08* (2013.01); *H04W 92/10* (2013.01)

(58) Field of Classification Search
CPC ..... H04W 16/22; H04W 17/29; H04W 92/10; H04W 88/08; H04W 24/06; H04W 24/02;
(Continued)

(56) References Cited

U.S. PATENT DOCUMENTS 7,890,821 B2   2/2011  Music et al.
7,948,254 B2   5/2011  Olgaard et al.
(Continued)

FOREIGN PATENT DOCUMENTS

EP    2 330 843 A1    6/2011
EP    2 512 173 A1    10/2012
(Continued)

OTHER PUBLICATIONS

"IXLOAD®—Wireless XAIR2," Data Sheet, Ixia, A Keysight Business, 915-2744-01-3071 Rev B, pp. 1-6 (2017).
(Continued)

*Primary Examiner* — Andrew Wendell (57) ABSTRACT

A method for testing an air interface device by simulating multi-UE uplink virtual MIMO includes receiving, by a multi-UE simulator, a downlink signal transmission from an air interface device under test. The method further includes decoding, by the multi-UE simulator, the downlink signal transmission to identify simulated UEs with uplink resource block grants. The method further includes assigning, by the multi-UE simulator, uplink data transmissions for the simulated UEs with uplink resource block grants to antennas or cables such that uplink data transmissions for simulated UEs with overlapping uplink resource block grants are assigned to different antennas or cables. The method further includes testing, by the multi-UE simulator, uplink virtual MIMO processing capability of the air interface device under test by generating and transmitting uplink signals from the simulated UEs with the overlapping uplink resource block grants to the air interface device under test using the different antennas or cables.

21 Claims, 6 Drawing Sheets (51) Int. Cl.
*H04B 7/04* (2017.01)
*H04W 16/22* (2009.01)
*H04B 17/29* (2015.01)
*H04B 7/0413* (2017.01)
*H04W 88/08* (2009.01)
*H04W 92/10* (2009.01)

(58) Field of Classification Search
CPC .... H04B 7/0413; H04B 10/07; H04B 17/102; H04B 17/12; H04B 7/0452; H04B 7/0495
See application file for complete search history.

(56) References Cited

U.S. PATENT DOCUMENTS

| | | | |
|---|---|---|---|
| 8,995,511 B2 | 3/2015 | Reed | |
| 9,002,290 B2 | 4/2015 | Olgaard | |
| 9,083,454 B2 | 7/2015 | Wicker, Jr. et al. | |
| 9,154,979 B2 | 10/2015 | Asokan et al. | |
| 9,204,325 B2 | 12/2015 | Subramanian et al. | |
| 9,660,739 B2 | 5/2017 | Reed | |
| 9,661,517 B2 | 5/2017 | Stott et al. | |
| 2003/0195735 A1* | 10/2003 | Rosedale | G06F 17/5009 703/13 |
| 2006/0229018 A1 | 10/2006 | Mlinarsky et al. | |
| 2006/0233111 A1 | 10/2006 | Wright | |
| 2007/0243826 A1 | 10/2007 | Liu | |
| 2009/0094492 A1 | 4/2009 | Music et al. | |
| 2009/0262719 A1 | 10/2009 | Shim et al. | |
| 2010/0075678 A1* | 3/2010 | Akman | H04W 24/06 455/436 |
| 2010/0285753 A1 | 11/2010 | Foegelle | |
| 2011/0293028 A1* | 12/2011 | Panicker | H04J 11/0036 375/260 |
| 2012/0100813 A1 | 4/2012 | Mow et al. | |
| 2013/0155872 A1* | 6/2013 | Subramanian | H04W 24/06 370/242 |
| 2013/0155878 A1* | 6/2013 | Deng | H04L 1/1854 370/252 |
| 2013/0208603 A1* | 8/2013 | Choi | H04L 5/0092 370/252 |
| 2013/0210474 A1 | 8/2013 | Kyösti | |
| 2013/0286860 A1 | 10/2013 | Dorenbosch et al. | |
| 2014/0086075 A1 | 3/2014 | Asokan et al. | |
| 2014/0140271 A1* | 5/2014 | Devarasetty | H04W 4/18 370/328 |
| 2014/0187260 A1 | 7/2014 | Jiang et al. | |
| 2014/0269527 A1* | 9/2014 | Asokan | H04L 5/001 370/329 |
| 2015/0092824 A1 | 4/2015 | Wicker, Jr. et al. | |
| 2016/0095104 A1* | 3/2016 | Chen | H04L 5/0048 370/329 |
| 2016/0373196 A1 | 12/2016 | Stott et al. | |
| 2018/0098349 A1* | 4/2018 | Sun | H04W 72/0406 |
| 2018/0199359 A1* | 7/2018 | Cao | H04W 72/1268 |

FOREIGN PATENT DOCUMENTS

| | | |
|---|---|---|
| EP | 2 597 794 A1 | 5/2013 |
| WO | WO 2015/050974 A1 | 4/2015 |
| WO | WO 2016/209338 A1 | 12/2016 |

OTHER PUBLICATIONS

Communication of the extended European search report for European Patent Application No. 14850849.2 (dated Apr. 19, 2017).
Notice of Allowance and Fee(s) Due for U.S. Appl. No. 14/746,733 (dated Jan. 20, 2017).
Notice of Allowance and Fee(s) Due for U.S. Appl. No. 14/746,733 (dated Oct. 7, 2016).
Notification of Transmittal of the International Search Report and the Written Opinion of the International Searching Authority, or the Declaration for Internation Application No.PCT/US2016/028320 (dated Jul. 26, 2016).
Communication of European publication number and information on the application of Article 67(3) EPC for European Patent Application No. 14850849.2 (dated Jul. 13, 2016).
Notice of Allowance and Fee(s) Due for U.S. Appl. No. 14/043,799 (dated Mar. 3, 2015).
Notification of Transmittal of the International Search Report and the Written Opinion of the International Searching Authority, or the Declaration for International Application No.PCT/US2014/058601 (dated Dec. 23, 2014).
Ex Parte Quayle Office Action for U.S. Appl. No. 14/043,799 (dated Dec. 3, 2014).
"UL Virtual MIMO Scheduling," 3GPP TSG-RAN1, Meeting #43, R1-051423, Nortel, pp. 1-7 (Nov. 7-11, 2005).
Communication pursuant to Article 94(3) EPC for European Patent Application Serial No. 14 850 849.2 (dated Mar. 26, 2018),

* cited by examiner

METHODS, SYSTEMS AND COMPUTER READABLE MEDIA FOR TESTING AN AIR INTERFACE DEVICE BY SIMULATING MULTI-USER EQUIPMENT (MULTI-UE) UPLINK VIRTUAL MULTIPLE INPUT MULTIPLE OUTPUT (MIMO)

TECHNICAL FIELD

The subject matter described herein relates to simulating multi-UE uplink transmissions to test an air interface device under test, such as an evolved node B (eNB). More particularly, the subject matter described herein relates to testing an air interface device by simulating multi-UE uplink virtual MIMO

BACKGROUND

In mobile communications networks, communications from the eNB to the UEs are referred to downlink communications, and communications from the UEs to the eNB are referred to as uplink communications. The eNB uses a technique referred to a MIMO to increase data throughput in the downlink direction. When using downlink MIMO, the eNB transmits multiple streams of data over the same frequency at the same time by using multiple transmit antennas and digital signal processing techniques such as pre-coding. These multiple streams of data can be targeted to one UE, referred to as single-user MIMO or to multiple UEs referred to as multiple-user MIMO (MU-MIMO). Spatial separation between multiple antennas on the UE or UEs, the characteristics of the transmission path between the eNB and the UE or UEs, called the channel, and pre-coding by the eNB allow the UE or UEs to decode the MIMO signal. In the case of MU-MIMO, each UE will use only the decoded intended for that UE and ignore the other streams.

MIMO can also be used on the uplink channel. Similar to the downlink MIMO technology, the eNB typically instructs a UE to transmit multiple streams of data simultaneously using multiple antennas. The purpose of MIMO in both the uplink and downlink directions is to increase throughput. Although the Third Generation Partnership Project (3GPP) defines uplink MIMO for LTE networks, due to size limits on UEs and cost, LTE UEs rarely support MIMO in the uplink direction, which limits the total uplink data throughput available to all UEs due to this limitation.

A technique, referred to as uplink virtual MIMO, to gain some of the benefits of increased aggregate uplink throughput for multiple UEs in a system is known. When the eNB instructs two or more different UEs to transmit on the uplink channel in overlapping resource blocks, the uplink transmission is referred to as uplink virtual MIMO, because the different UEs together can achieve uplink aggregate throughput similar to those of a multi-antenna MIMO system. Uplink virtual MIMO allows two or more UEs to share the same frequency resources to transmit data. Therefore, although each UE only uses one antenna, multiple UEs transmission forms an equivalent multiple transmit antenna system. Together with multiple receive antennas at eNB side, the UEs and the eNB achieve uplink virtual MIMO. The eNB can decode data from UEs that utilize the same frequency resources at the same time with an advanced receiver that considers the characteristics of the different paths of the spatially separated UEs and achieves higher aggregate UL data throughput.

Before an eNB with uplink virtual MIMO functionality can be deployed in a live network, the uplink virtual MIMO functionality of the eNB should be tested. One way to perform uplink virtual MIMO testing is to use real UEs. However, using real UEs makes the test hard to set up and difficult to control, especially with large numbers of UEs. Accordingly, there is a need for an alternative method to test the uplink virtual MIMO functionality of an air interface device, such as an eNB.

SUMMARY

A method for testing an air interface device by simulating multi-user equipment (multi-UE) uplink virtual multiple input-multiple output (MIMO) includes receiving, by a multi-UE simulator, a downlink signal transmission from an air interface device under test. The method further includes decoding the downlink signal transmission to identify simulated UEs with uplink resource block grants. The method further includes assigning uplink data transmissions for the simulated UEs with uplink resource block grants to antennas or cables such that uplink data transmissions for simulated UEs with overlapping uplink resource block grants are assigned to different antennas or cables. The method further includes testing uplink virtual MIMO processing capability of the air interface device under test by generating and transmitting uplink signals from the simulated UEs with the overlapping uplink resource block grants to the air interface device under test using the different antennas or cables.

A system for testing an air interface device by simulating multi-UE uplink virtual MIMO includes a multi-UE simulator for receiving a downlink signal transmission from an air interface device under test. The multi-UE simulator includes a downlink signal decoder for decoding the downlink signal transmission to identify simulated UEs with uplink resource block grants. The system further includes an uplink virtual MIMO simulator for assigning uplink data transmissions for simulated UEs with uplink resource block grants to antennas or cables such that uplink data transmissions for simulated UEs with overlapping uplink resource block grants are assigned to different antennas or cables and testing uplink virtual MIMO processing capability of the air interface device under test by generating and transmitting uplink signals from the simulated UEs with the overlapping uplink resource block grants to the air interface device under test using the different antennas or cables.

The subject matter described herein simulating multi-UE uplink virtual MIMO may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

Figure 1A:
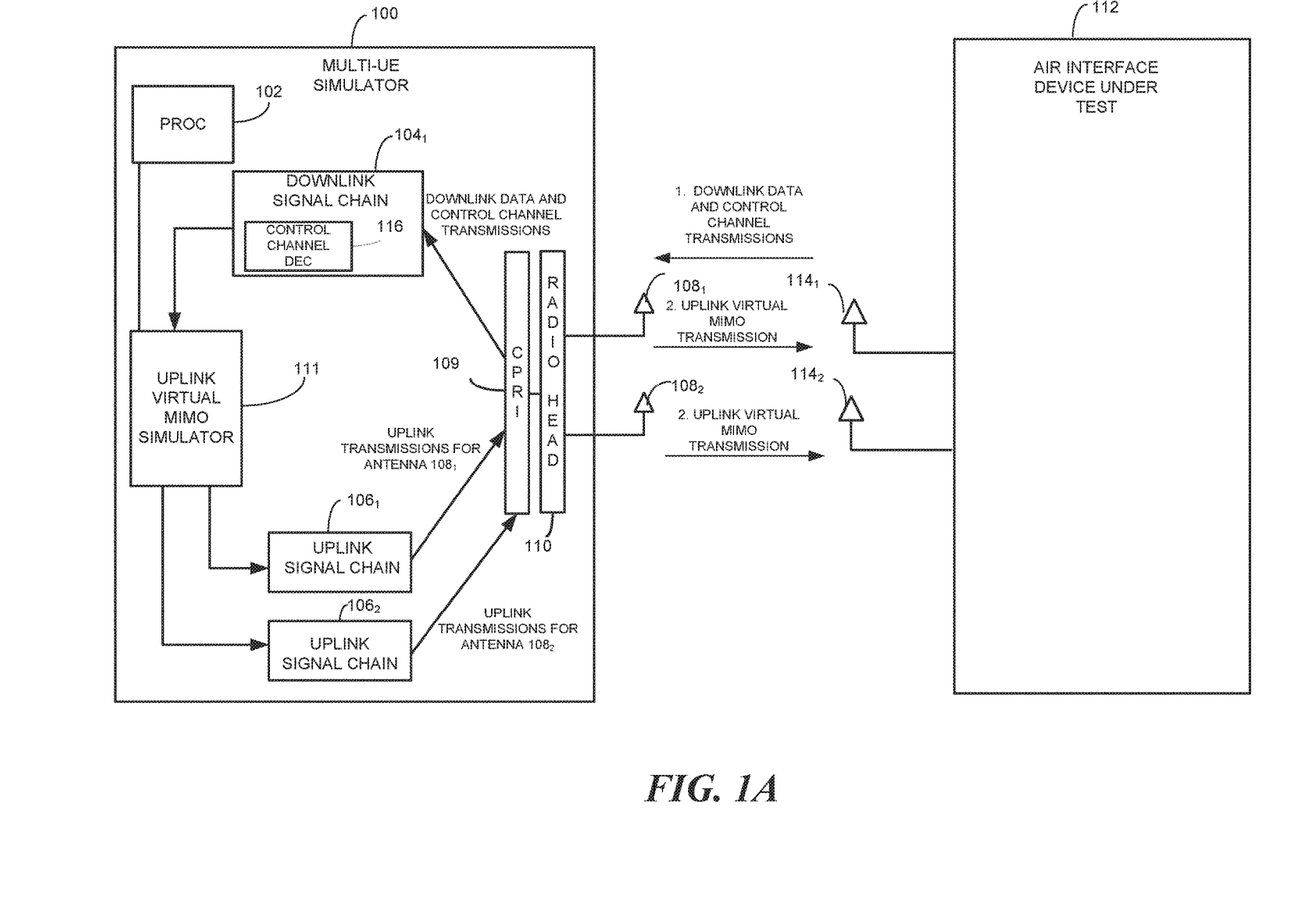
FIG. 1A is a block diagram of a system for testing an air interface device under test by simulating multi-UE uplink virtual MIMO.

The subject matter described herein includes methods, systems, and computer readable media for testing an air interface device by simulating multi-UE uplink virtual MIMO. FIG. 1A is a block diagram of an exemplary system for testing an air interface device under test by simulating multi-UE uplink virtual MIMO. Referring to FIG. 1A, a multi-UE simulator 100 includes a processor 102, a downlink signal chain 104, uplink signal chains $106_1$ and $106_2$, antennas $108_1$ and $108_2$, common public radio interface (CPRI) 109, radio head 110 and uplink virtual MIMO simulator 111.

Processor 102 may execute control software that controls the overall operation of multi-UE simulator 100. One example of such software is uplink virtual MIMO simulator 111, which may execute on processor 102 to control multi-UE simulator 100 to simulate multiple UEs. The simulated UEs may be long term evolution (LTE) or LTE advanced UEs. In one example, uplink virtual MIMO simulator 111 may control the simulated UEs to simulate uplink virtual MIMO.

Downlink signal chain 104 includes various processing blocks for processing downlink signals from air interface device under test 112. In one example, air interface device under test 112 may be an e-node B, a node B, a base station, or other device that communicates with UEs over the air interface. Air interface device under test 112 may include antennas $114_1$ and $114_2$. Although only two DUT antennas $114_1$ and $114_2$ are illustrated for simplicity, it is understood that an air interface device, such as an eNB may include more than two antennas. It is also understood that multi-UE simulator 100 may also include more than two antennas for testing uplink virtual MIMO functionality of air interface device 112.

Returning to multi-UE simulator 100, downlink signal chain 104 includes a single downlink control channel signal decoder 116. Downlink control channel signal decoder 116 decodes downlink signals from air interface device under test 112 to identify resource block allocations for UEs in the uplink direction along with other functions. In one example, each downlink signal decoder 116 may implement blind downlink control information (DCI) decoding to determine the recent resource block allocations for uplink signals. An example of blind decoding that may be implemented by downlink signal decoders 116 is described in commonly assigned U.S. Pat. No. 9,204,325, the disclosure of which is incorporated herein by reference in its entirety.

Uplink signal chains $106_1$ and $106_2$ include various processing blocks for modulating uplink data onto carrier signals and transmitting the uplink data to air interface device under test 112. Examples of operations that may be performed by uplink signal chains $106_1$ and $106_2$ include turbo encoding of uplink data, rate matching, channel multiplexing, subcarrier mapping, Fourier transformation and inverse Fourier transformation, etc. The output of each uplink signal chain $106_1$ and $106_2$ is an uplink signal mapped to uplink resource blocks. The uplink signals are transmitted to air interface device under test 112 via CPRI interface 109, radio head 110, and antennas $108_1$ and $108_2$. CPRI interface 109 communicates uplink and downlink signals to and from radio head 110. Radio head 110 includes RF circuitry, such as up and down converters, A/D converters, and filters for sending and receiving data over antennas $108_1$ and $108_2$ Uplink virtual MIMO simulator 111 receives uplink resource block grants from decoders 111 assigns uplink data transmissions for simulated UEs with uplink resource block grants to uplink signal chains $106_1$ or $106_2$ so that uplink data transmissions for simulated UEs with overlapping uplink resource block assignments are transmitted simultaneously over different antennas $108_1$ or $108_2$. An exemplary uplink resource block assignment algorithm that may be implemented by uplink virtual MIMO simulator 111 will be described in more detail below. One purpose of such an algorithm is to ensure that UEs with overlapping resource blocks are not allocated to the same antenna. Uplink virtual MIMO simulator 111 or uplink signal chains $106_1$ and $106_2$ may also simulate channel effects, such as noise, fading, Doppler shifting, or other channel effects on a per UE or aggregate basis to test the scheduling capabilities of air interface device 112 in response to such conditions. Uplink virtual MIMO simulator 111 may also monitor the response of air interface device under test 112 to the uplink virtual MIMO transmissions and the simulated channel conditions.

Figure 1B:
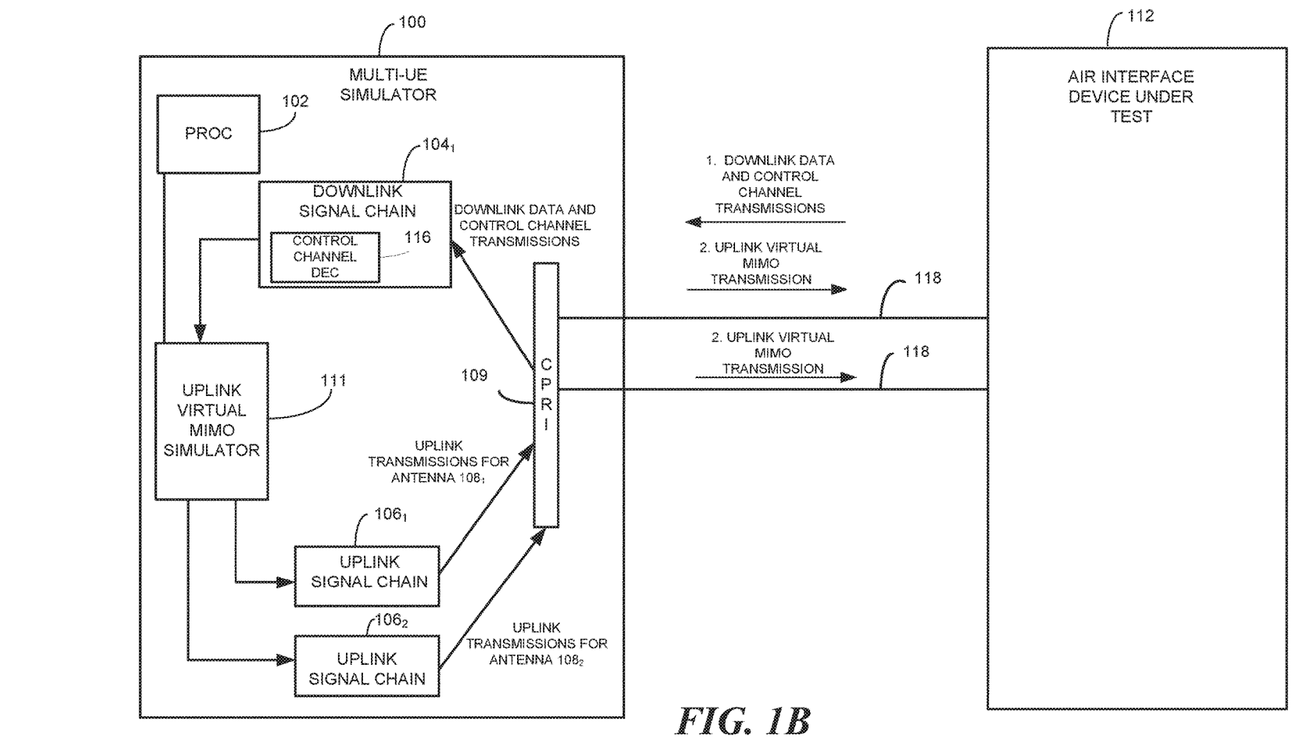
FIG. 1B is a block diagram of an alternate implementation of a system for testing an air interface device under test by simulating multi-UE uplink virtual MIMO.

FIG. 1B illustrates an alternate implementation of the test system in FIG. 1A. In FIG. 1B, rather than being connected to air interface device under test 112 with antennas, multi-UE simulator 100 is connected to air interface device under test 112 using cables 118 to carry uplink and downlink signals, and radio head 110 and antennas $108_1$ and $108_2$ are omitted or bypassed. Each cable 118 simulates the air interface between multi-UE simulator 100 and air interface device under test 112. Other than the use of cables instead of antennas, the implementation illustrated in FIG. 1B operates identically to the implementation illustrated in FIG. 1A with regard to simulating uplink virtual MIMO.

Figure 1C:
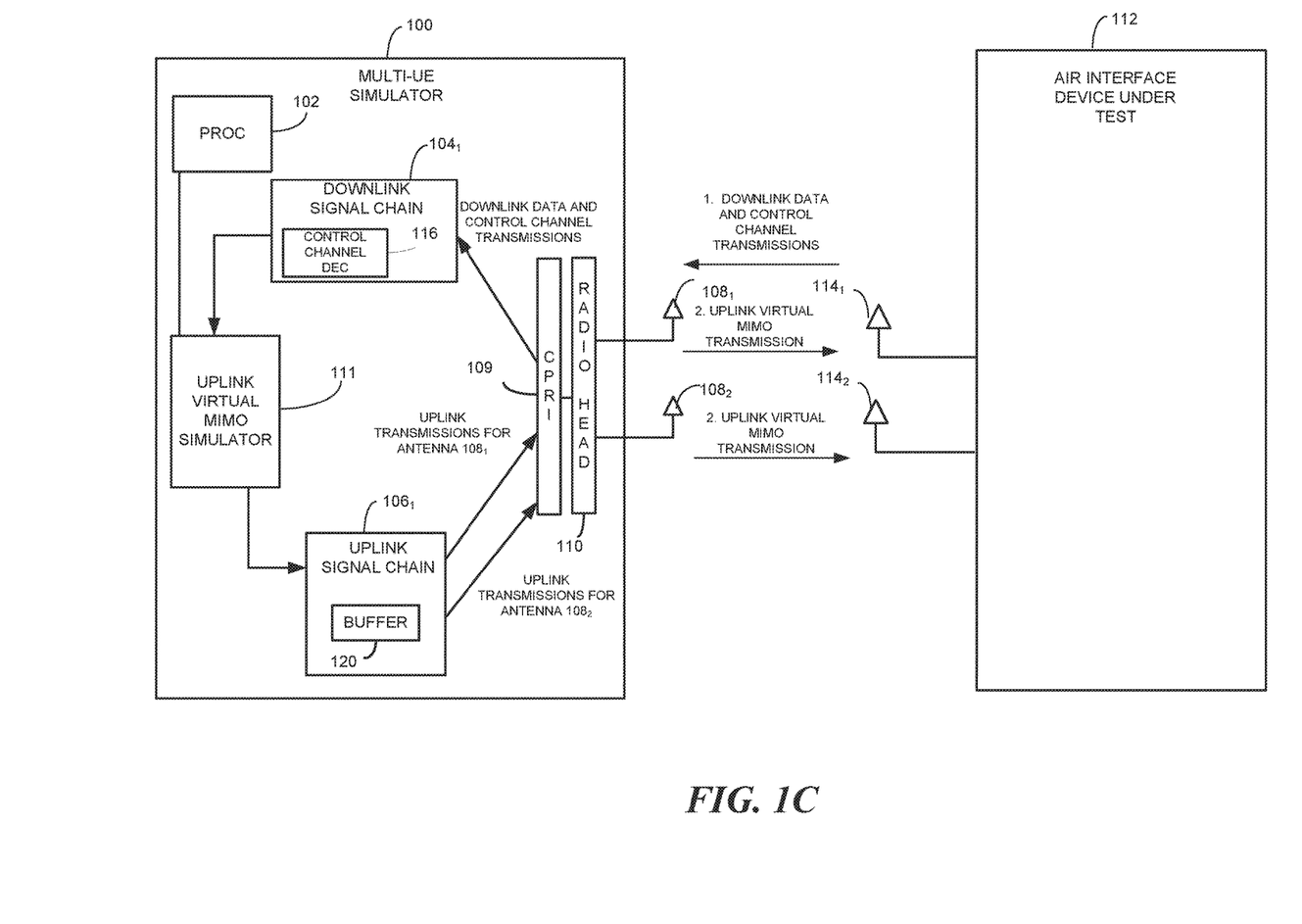
FIG. 1C is a block diagram of yet another alternate implementation of a system for testing an air interface device under test by simulating multi-UE uplink virtual MIMO.

FIG. 1C illustrates yet another alternate implementation of the subject matter described herein. In FIG. 1C, rather than having a one-to-one mapping between uplink signal chains $106_1$ and $106_2$ and antennas $108_3$ and $108_4$, a signal uplink signal chain 106 feeds plural antennas $108_1$ and $108_2$. Each uplink signal chain $106_1$ and $106_2$ may include a buffer 120 for buffering uplink data so that UEs with overlapping uplink resource block grants can be transmitted on different antennas. That is, when data from a UE is ready to transmit, that data may be buffered in buffer 120 until the data for the other UE with the overlapping uplink resource block grants is ready to transmit. When the data for all of the UEs with overlapping uplink resource blocks is ready to be transmitted, uplink virtual MIMO simulator 111 may transmit the data to antennas $108_1$ and $108_2$ to simulate the uplink virtual MIMO condition.

Figure 1D:
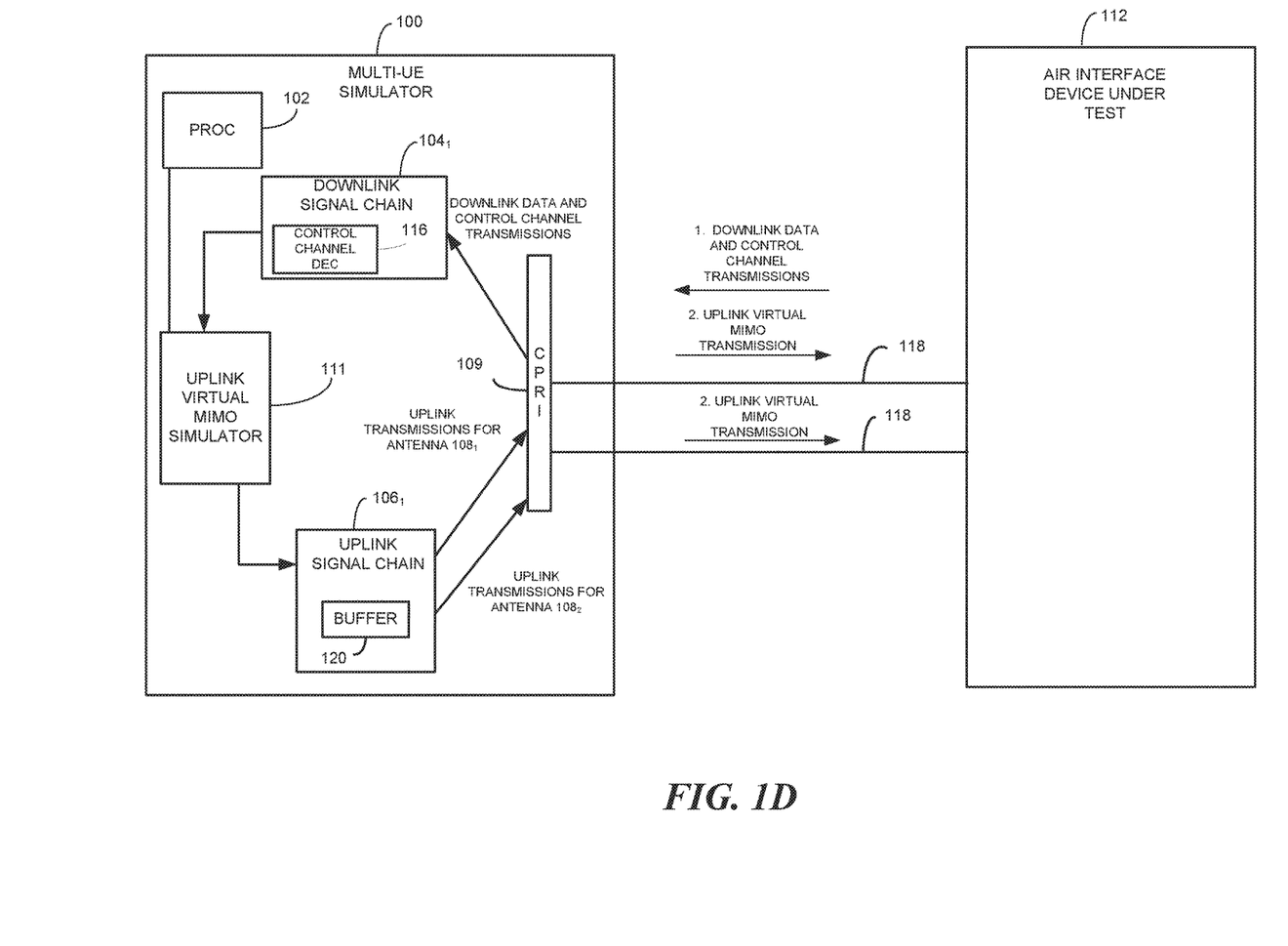
FIG. 1D is a block diagram of yet another alternate implementation of a system for testing an air interface device under test by simulating multi-UE uplink virtual MIMO.

FIG. 1D illustrates yet another alternate implementation of the subject matter described herein. FIG. 1D is the same as FIG. 1C except that rather than being connected to air interface under test 112 via antennas, multi-UE simulator 100 is connected to air interface device under test 112 with cables 114. Operation of multi-UE simulator 100 illustrated in FIG. 1D is the same as that illustrated in FIG. 1C except that the uplink and downlink transmission occur over cables rather than over an air interface.

Figure 2:
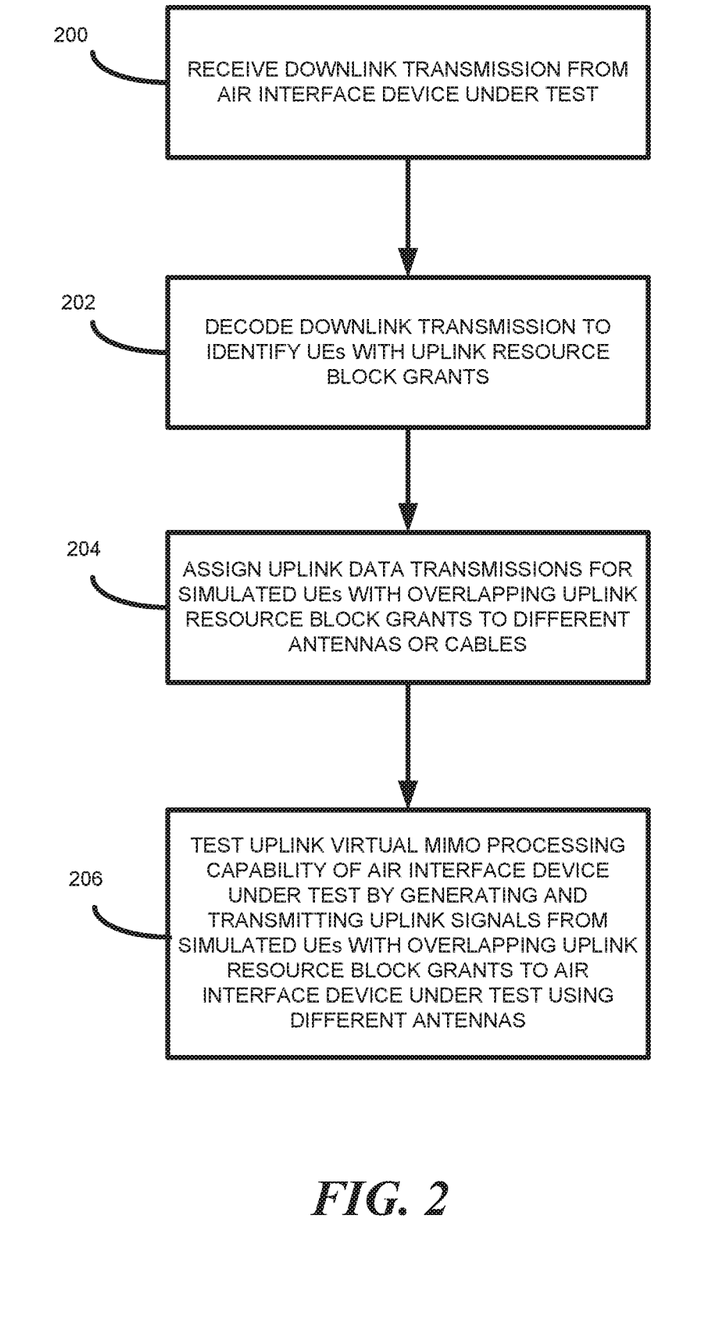
FIG. 2 is a flow chart illustrating an exemplary process for simulating multi-UE uplink virtual MIMO.

FIG. 2 is a flow chart illustrating an exemplary process for testing an air interface device using uplink virtual MIMO. Referring to FIG. 2, in step 200, a multi-UE simulator receives a downlink signal transmission from an air interface device under test. For example, multi-UE simulator 100 may receive a downlink signal transmission from air interface device under test 112. The signal may be received by one of antennas $116_1$ or $116_2$ or by cables 118 that are used to simulate antennas.

In step 202, the downlink signal transmission is decoded to identify UEs with uplink resource block grants. For example, downlink decoders 108 may decode downlink control signals to identify UEs with uplink resource block grants and the corresponding resource blocks assigned to uplink data transmissions for the UEs.

Figure 3:
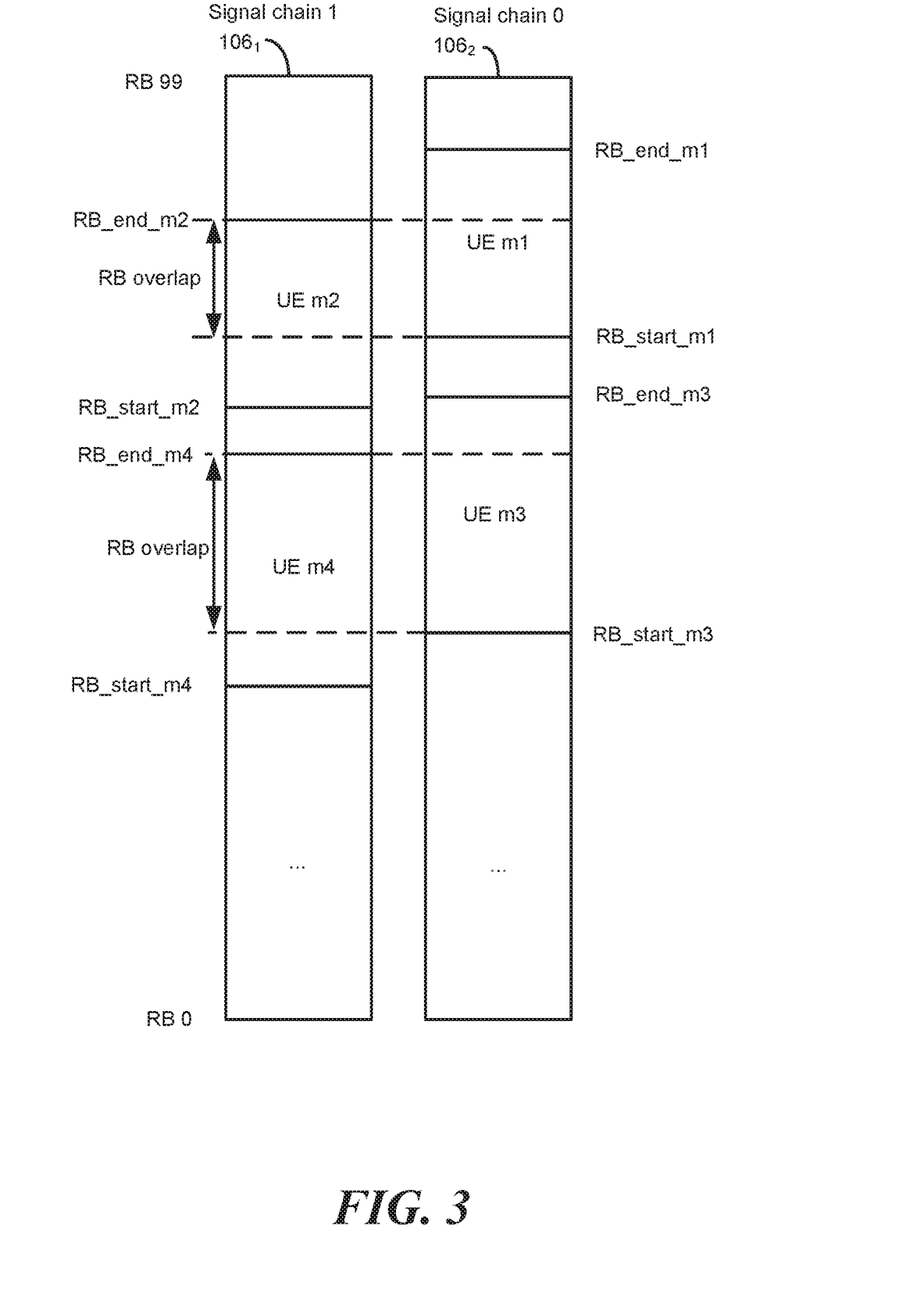
FIG. 3 is a diagram illustrating an exemplary resource block allocation algorithm for simulating multi-UE uplink virtual MIMO.

In step 204, uplink data transmissions for simulated UEs with overlapping uplink resource block grants are assigned to different antennas or cables. For example, uplink virtual MIMO simulator 111 may execute the resource block assignment algorithm that assigns uplink data transmissions for simulated UEs with overlapping uplink resource block grants to different antennas or cables. FIG. 3 illustrates an example of how such an algorithm may operate. In FIG. 3, uplink signal chains $106_1$ and $106_2$ are illustrated. Each uplink signal chain is a pipeline of processing elements that generate uplink signals to be transmitted to the eNB under test. As stated above, each uplink signal chain may perform operations such as rate matching, Fourier transformation, inverse Fourier transformation, etc. In addition, each uplink signal chain may add simulated channel effects, such as fading, noise, Doppler shifting, etc. to the uplink signals.

In the illustrated example, each uplink signal chain is capable of simultaneously processing 100 resource blocks number RB 0-RB 99. The example in FIG. 3 is tailored to LTE and LTE advanced networks, where an uplink signal transmission includes 100 resource blocks. Uplink signal chains capable of handling different numbers of resource blocks can be used for other network technologies. In FIG. 3, uplink signal transmissions for UEs are assigned to the uplink signal chains so that uplink transmissions for UEs with overlapping uplink resource block assignments are assigned to different uplink signal chains. For example, an uplink signal transmission for UE m2 is assigned a resource block range of RB_start_m2 to RB_end_m2, and an uplink signal transmission for UE m1 is assigned a resource block range of RB_start_m1 to RB_end_m1. The range RB_start_m2 to RB_end_m2 overlaps with the range RB_start_m1 to RB_end_m1. This overlap is indicated by the area between the dashed lines ranging from RB_start_m1 to RB_end_m2. Because of the overlap in resource block assignments, the uplink signal transmission for UE m1 is assigned to a different uplink signal chain which feeds a different antenna from the uplink signal transmission UE m2. Alternatively, as discussed above, uplink transmissions for UEs with overlapping uplink resource block assignments can be assigned to the same uplink signal chain which feeds multiple antennas, and buffering can be used to ensure that the uplink signals from the different UEs with overlapping resource block assignments are delivered to different antennas.

Similarly, in FIG. 3, the resource block assignments for UE m4 and UE m3 overlap. The area over overlap is indicated by the dash lines ranging from RB_start_m3 to RB_end_m4. Accordingly, uplink transmissions for UEs m4 and m3 are assigned to different uplink signal chains that feed different antennas. The following is an example uplink resource block assignment algorithm that may be used by uplink virtual MIMO simulator 111 in assigning UEs with overlapping resource block grants to different antennas.

For all UEs with UL grants, UE 1 to N, let RB_start_k denote the starting RB number on uplink allocated for UE k and RB_end_k denote the last RB on uplink allocated to the same UE.

1. Order the UEs with decreasing RB_end as RB_end_m1. RB_end_mN
2. Allocate RB_end_m1 to UL signal chain 0, RB_end_m2 to UL signal chain 1,
3. Find the UL signal chain with larger last allocated RB_start and allocate next UE in the queue to it. For example, if RB_start_m1>=RB_start_m2, UE m3 will be allocated to signal chain 0. Otherwise, UE m3 will be allocated to signal chain 1.
4. Repeat step 3 until all UEs are allocated.

This algorithm can be easily extended to more than two uplink signal chains.

Returning to FIG. 2, in step 206, uplink virtual MIMO processing capability of the air interface device under test is tested by generating and transmitting uplink signals for the simulated UEs with overlapping uplink resource block grants to the air interface device under test using the different antennas or cables. For example, once simulator 111 assigns UEs to particular antennas, the signals for the different UEs are transmitted to the corresponding uplink signal chain and then to the antennas. The antennas transmit the uplink signals to air interface device under test 112. In an alternate implementation, the signals may be transmitted over cables. In yet another alternate implementation, the uplink data for different UEs with overlapping uplink resource blocks may be processed by the same signal chain and buffering may be used to ensure that the overlapping resource blocks are transmitted by different antennas simultaneously.

In step 208, the response of air interface device under test 112 to the simulated uplink virtual MIMO condition is monitored. For example, uplink virtual MIMO simulator 111 may monitor subsequent downlink signal transmissions from air interface device under test 112 to see whether the uplink signals from the different UEs with overlapping resource block assignments were properly decoded. If uplink virtual MIMO simulator 111 simulates channel fading or other channel impairment, multi-UE simulator 100 may monitor scheduling by air interface device under test 112 in response to the channel impairment.

Thus, using the steps illustrated in FIG. 2, the subject matter described herein tests the response of air interface device under test 112 to simulate an uplink virtual MIMO. Such testing is advantageous over using real UEs because simulating multiple UEs using multi-UE simulator allows central control of the simulated UEs and centralized monitoring of the response of the air interface device under test. Such simulation improves the performance of wireless network test systems and wireless networks themselves. The multi-UE antenna assignment algorithm also ensures that UEs with overlapping resource blocks are not assigned to the same antenna.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for testing an air interface device by simulating multi-user equipment (multi-UE) uplink virtual multiple input-multiple output (MIMO), the method comprising:
   receiving, by a multi-UE simulator, a downlink signal transmission from an air interface device under test;
   decoding, by the multi-UE simulator, the downlink signal transmission to identify simulated UEs with uplink resource block grants;
   assigning, by the multi-UE simulator, uplink data transmissions for the simulated UEs with uplink resource block grants to antennas or cables such that uplink data transmissions for simulated UEs with overlapping uplink resource block grants are assigned to different antennas or cables; and
   testing, by the multi-UE simulator, uplink virtual MIMO processing capability of the air interface device under test by generating and transmitting uplink signals from the simulated UEs with the overlapping uplink resource block grants to the air interface device under test using the different antennas or cables.

2. The method of claim 1 wherein the air interface device under test comprises an evolved node B (eNB).

3. The method of claim 1 wherein the simulated UEs comprise long term evolution (LTE) or LTE advanced UEs.

4. The method of claim 1 wherein decoding the downlink signal transmission includes performing blind downlink control information (DCI) decoding to identify the uplink resource block grants.

5. The method of claim 1 wherein assigning the uplink data transmissions for the simulated UEs with overlapping uplink resource block grants to different antennas or cables includes assigning the uplink data transmissions for the simulated UEs with overlapping uplink resource block grants to different uplink signal chains that are respectively associated with the different antennas or cables.

6. The method of claim 5 wherein assigning uplink data transmissions for the simulated UEs with overlapping uplink resource block grants to different uplink signal chains includes executing an uplink resource block assignment algorithm that identifies overlapping resource block ranges allocated to different simulated UEs and assigns the uplink data transmissions for the simulated UEs with the overlapping ranges to the different uplink signal chains.

7. The method of claim 1 comprising processing data for at least some of the UEs with overlapping uplink resource block grants assigned to different antennas or cables using a common uplink signal chain and buffering at least some of the data so that data for different UEs with overlapping uplink resource block grants can be simultaneously delivered to different antennas or cables.

8. The method of claim 1 wherein transmitting uplink signals from the simulated UEs with the overlapping resource block grants to the air interface device under test using the different antennas or cables includes utilizing the different antennas to transmit the uplink signals to the air interface device under test.

9. The method of claim 1 wherein transmitting uplink signals from the simulated UEs with the overlapping resource block grants to the air interface device under test using the different antennas or cables includes utilizing the different cables to transmit the uplink signals to the air interface device under test.

10. The method of claim 1 comprising monitoring a response of the air interface device under test to the uplink signals with overlapping uplink resource block grants.

11. A system for testing an air interface device by simulating multi-user equipment (multi-UE) uplink virtual multiple input-multiple output (MIMO), the system comprising:
    a multi-UE simulator for receiving a downlink signal transmission from an air interface device under test, the multi-UE simulator including:
      a downlink signal decoder for decoding the downlink signal transmission to identify simulated UEs with uplink resource block grants; and
      an uplink virtual MIMO simulator for assigning uplink data transmissions for the simulated UEs with uplink resource block grants to antennas or cables such that uplink data transmissions for simulated UEs with overlapping uplink resource block grants are assigned to different antennas or cables and testing uplink virtual MIMO processing capability of the air interface device under test by generating and transmitting uplink signals from the simulated UEs with the overlapping uplink resource block grants to the air interface device under test using the different antennas or cables.

12. The system of claim 11 wherein the air interface device under test comprises an evolved node B (eNB).

13. The system of claim 11 wherein the simulated UEs comprise long term evolution (LTE) or LTE advanced UEs.

14. The system of claim 11 wherein decoding the downlink signal transmission includes performing blind downlink control information (DCI) decoding to identify the uplink resource block grants.

15. The system of claim 11 wherein assigning the uplink data transmissions for the simulated UEs with overlapping uplink resource block grants to different antennas or cables includes assigning the uplink data transmissions for the simulated UEs with overlapping uplink resource block grants to different uplink signal chains that are respectively associated with the different antennas or cables.

16. The system of claim 15 wherein assigning the uplink data transmissions for the simulated UEs with overlapping uplink resource block grants to different uplink signal chains includes executing an uplink resource block assignment algorithm that identifies overlapping resource block ranges allocated to different simulated UEs and assigns the uplink data transmissions for the simulated UEs with the overlapping ranges to the different uplink signal chains.

17. The system of claim 11 comprising processing data for at least some of the UEs with overlapping uplink resource block grants assigned to different antennas or cables using a common uplink signal chain and buffering at least some of the data so that data for different UEs with overlapping uplink resource block grants can be simultaneously delivered to different antennas or cables.

18. The system of claim 11 wherein transmitting uplink signals from the simulated UEs with the overlapping resource block grants to the air interface device under test using the different antennas or cables includes utilizing the different antennas to transmit the uplink signals to the air interface device under test.

19. The system of claim 11 wherein transmitting uplink signals from the simulated UEs with the overlapping resource block grants to the air interface device under test using the different antennas or cables includes utilizing the different cables to transmit the uplink signals to the air interface device under test.

20. The system of claim 11 comprising monitoring a response of the air interface device under test to the uplink signals with overlapping uplink resource block grants.

21. A non-transitory computer readable medium having stored thereon executable instructions that when executed by the processor of a computer control the computer to perform steps comprising:
   receiving, by a multi-UE simulator, a downlink signal transmission from an air interface device under test;
   decoding, by the multi-UE simulator, the downlink signal transmission to identify simulated UEs with uplink resource block grants;
   assigning, by the multi-UE simulator, uplink data transmissions for the simulated UEs with uplink resource block grants to antennas or cables such that the uplink data transmissions for simulated UEs with overlapping uplink resource block grants are assigned to different antennas or cables; and
   testing, by the multi-UE simulator, uplink virtual MIMO processing capability of the air interface device under test by generating and transmitting uplink signals from the simulated UEs with the overlapping uplink resource block grants to the air interface device under test using the different antennas or cables.

* * * * *